Patented May 9, 1933

1,908,619

UNITED STATES PATENT OFFICE

FERD W. WIEDER, OF BERKELEY, CALIFORNIA, ASSIGNOR TO SAN FRANCISCO SULPHUR COMPANY, OF SAN FRANCISCO, CALIFORNIA, A CORPORATION OF CALIFORNIA

POWDERED MATERIAL AND PROCESS OF MANUFACTURING SAID MATERIAL

No Drawing.   Application filed August 13, 1924.   Serial No. 731,874.

In order to control the ravages of plant insects, it is common to spray the plants with insecticidal agencies. Among the commoner insecticides, there is finely divided sulphur, which is sprayed either in a wet or dry condition on the foliage or other exposed portions of the plant structure. When this is done with sulphur as heretofore provided, a large portion is wasted, because of the fact that the pulverized sulphur rolls off quite readily on the occurrence of even a trifling amount of mechanical disturbance of the plant, such as may be due to wind, rain or other natural agencies and a relatively small portion adheres to the leaves. The result is that not only must the plants be sprayed very frequently, but there is also a considerable loss in the effectiveness of the insecticide.

It is one of the objects of my invention to provide a finely powdered insecticide that has the property of adhering strongly to the surfaces upon which it may be sprayed. The saving in labor and material effected by this means is of very great importance, especially where extensive plant culture is under way.

It has been found that finely divided sulphur when stored even for a comparatively short interval, becomes lumpy or packs into cakes. When in this condition, it is evident that it cannot be sprayed either in a wet or dry condition, or used as an insecticide or for other purposes. It is another object of my invention to provide powdered sulphur that may be stored for indefinite periods without danger of caking or packing, and with assurance that it will remain in a finely comminuted state.

The grinding of sulhur (or for that matter other oxidizable materials) into finely divider particles has been found to entail the danger of explosions during the grinding operation. In fact, these dust explosions occur quite frequently near the discharge end of the grinder, and have been explained on the theory that the particles carry charges of electricity which may under favorable circumstances set up an igniting spark. From whatever cause, these occurrences have been expected, and to minimize the damage produced by the explosions, the grinder is isolated from other equipment or machinery, and the discharge end thereof is made fireproof. Notwithstanding all these precautions however, when explosions of sulphur dust do occur, the molten sulphur in the grinder may flow into the unground sulphur or into the sulphur which has already been ground, thereby destroying much of its value. It is still another object of my invention to make it possible to perform the grinding operation without danger of explosions, and thereby with a considerable saving over prior modes of powdered sulphur manufacture.

The threefold objects hereinbefore discussed may be summarized as follows: (a) imparting of increased adhesive qualities; (b) prevention of caking; and (c) prevention of explosions during manufacture. All of these objects are attained by one and the self-same treatment of the sulphur during the course of manufacture. This treatment involves in all cases the addition of an ingredient to the sulphur before grinding. It is also likely that the process is valuable when applied to other forms of finely divided materials, but I have chosen sulphur as the most convenient example, irrespective of the use to which the sulphur may be put.

Furthermore, my invention possesses other advantageous features, some of which with the foregoing, will be set forth at length in the following description, where I shall describe in detail the mode of application of my invention to a sulphur insecticide. The scope of the invention itself, however, may best be ascertained from the claims appended hereto, since it is to be understood that I do not desire to limit myself to the form disclosed, the invention being capable of embodiment in many other forms.

I have discovered that the addition of certain organic compounds in small proportions to the sulphur dust imparts remarkably good qualities thereto. These compounds that I have found so useful are known generally by the name of resins, and by that term I intend to include either natural or artificial compounds. For example, I find that the addition of ordinary rosin (also called colophony) in the proportion of from $\frac{1}{10}$% to 1% by weight, of the sulphur, prevents the caking thereof and also acts as an adherent for it when it is sprayed. However, other resins of other origin and composition also produce similar results; natural or artificial asphalts or pitches, for example, gilsonite, and various residues resulting from the distillation of vegetable, animal, or mineral oils can be used for this purpose. Perhaps the most desirable forms of resin however are such as physically resemble rosin, and that are included in a group of natural plant materials or gums. A few examples (in addition to rosin or colophonoy) are dammar, sandarac, and rubber gum. The best results have been found to obtain when resinous materials containing abietic acid or compounds substantially similar to abietic acid are used.

These materials may be added in a substantially pure state, or in combination with other materials. Thus finely divided hard rubber can be used, although of course it contains other materials than the pure gum which forms its basis; and in fact the resin may be present in the compound either as a true chemical compound or as a mechanical mixture, or as both. My use of the term "resinous material" is intended to cover either pure resins or materials in which resin forms an ingredient.

The manner in which this resinous material is added to the sulphur may be varied considerably. They may be first dissolved in a solvent, or added either in fluid or dry form. In order to secure the advantageous effects of preventing explosion during grinding, it must of course be added prior to the grinding operation, and while the sulphur is in a molten state. When rosin is used, the sulphur is first melted, which may be done by heating it to 290° Fahrenheit; then the rosin is melted and added to the sulphur. It has been found that the resinous material reacts chemically with the molten sulphur. The mixture is thoroughly agitated while liquid, so as to produce uniformity. After it cools, the substance is ground to the desired degree of fineness. It is during this operation that there is a likelihood of explosions occurring, yet when the rosin is used as described these explosions are eliminated. After grinding, the material may be bolted in order to separate the coarse particles.

The proportions of the resinous material may be varied widely, and the best proportions depend somewhat upon the character of material used. Rosin is the most suitable since it is easily procurable and may be readily manipulated, its proportion as stated heretofore, being from $\frac{1}{10}$% to 1% by weight to the sulphur. But no matter what character of material is used, it is necessary to add only a very small percentage. For this reason, the color and appearance in general of the sulphur is not appreciably altered by the use of my invention. The insecticidal properties are of course intact, with the additional advantage that is has a decided adhering quality, which renders it much more economical.

Of course the use of an adherent with a finely divided mass may have applications other than for insecticidal purposes. By the use of such a term as "adherent", I intend to cover all equivalents of resin that may be present in the finely powdered mass.

Similarly, the action of such materials as resin to maintain the pulverized sulphur in a finely divided state, may be utilized in connection with other materials. This effect may be due to the diffusion of the resin in the mass or to other obscure causes.

The remaining important effect, that of preventing explosions during grinding, may quite readily be made use of when manufacturing other finely divided materials. So far as I am aware, I am the first to discover that such explosions may be prevented by the addition of a very small amount of material to the grinding mill product.

I claim:

1. A material for use as an insecticide consisting of a finely divided substantially non-lumping product obtained upon fusing a mixture of sulphur with a small quantity of resin, cooling the mixture, and finely dividing the mixture.

2. A material for use as an insecticide consisting of a finely divided substantially non-lumping product obtained upon fusing a mixture of sulphur with a small quantity of a resinous material including abietic acid, cooling the mixture, and finely dividing the mixture.

In testimony whereof, I have hereunto set my hand.

FERD W. WIEDER.